United States Patent [19]

Close

[11] Patent Number: 5,453,287

[45] Date of Patent: Sep. 26, 1995

[54] METHOD FOR PREPARING FOOD PRODUCTS USING INTERCONNECTABLE PANELS

[75] Inventor: J. Garth Close, Malakoff, Tex.

[73] Assignee: Rollform of Jamestown, Inc., Jamestown, N.Y.

[21] Appl. No.: 143,305

[22] Filed: Oct. 26, 1993

Related U.S. Application Data

[63] Continuation-in-part of Ser. No. 852,429, Mar. 16, 1992.

[51] Int. Cl.⁶ .................................. A21D 8/00; A23P 1/00
[52] U.S. Cl. ........................... 426/512; 99/426; 249/155; 249/DIG. 1; 426/523
[58] Field of Search ......................... 426/512, 496, 426/523; 99/426; 249/155, DIG. 1

[56] References Cited

U.S. PATENT DOCUMENTS

| | | | |
|---|---|---|---|
| 2,769,277 | 11/1956 | Keelor | 47/33 |
| 2,812,813 | 11/1957 | Zarnowski | 52/529 |
| 2,877,600 | 3/1959 | Slate | 47/33 |
| 3,394,524 | 7/1968 | Howarth | 52/588 |
| 3,417,519 | 12/1968 | Hitter | 52/11 |
| 3,524,292 | 10/1970 | Bottom | 52/522 |
| 3,606,718 | 9/1971 | Curran | 52/542 |
| 3,611,660 | 10/1971 | Costello | 52/314 |
| 3,780,978 | 12/1973 | Proul | 99/426 |
| 3,898,783 | 10/1975 | Matlock et al. | 52/529 |
| 3,969,866 | 7/1976 | Kyne | 52/588 |
| 4,063,393 | 12/1977 | Toti | 52/245 |
| 4,171,599 | 10/1979 | Lipp | 52/528 |
| 4,819,398 | 4/1989 | Dameron | 52/529 |

FOREIGN PATENT DOCUMENTS

| | | | |
|---|---|---|---|
| 746674 | 6/1933 | France | 52/529 |
| 1119442 | 6/1956 | France | 52/529 |

Primary Examiner—George Yeung
Attorney, Agent, or Firm—Kirkpatrick & Lockhart

[57] ABSTRACT

A method for preparing a food product having a predetermined perimetrical shape from a moldable mixture of food product ingredients. The method, in a preferred form, comprises the steps of providing a plurality of substantially planar panels that can be removably interconnected; bending and interconnecting the panel members to form a panel assembly having the desired perimetrical shape; placing the panel assembly on a bottom member to form a cavity; sealing the intersection between the panel assembly and the bottom member; pouring the moldable food product into the cavity and processing the food product to cause it to solidify; and thereafter, removing the panel assembly from the food product.

8 Claims, 10 Drawing Sheets

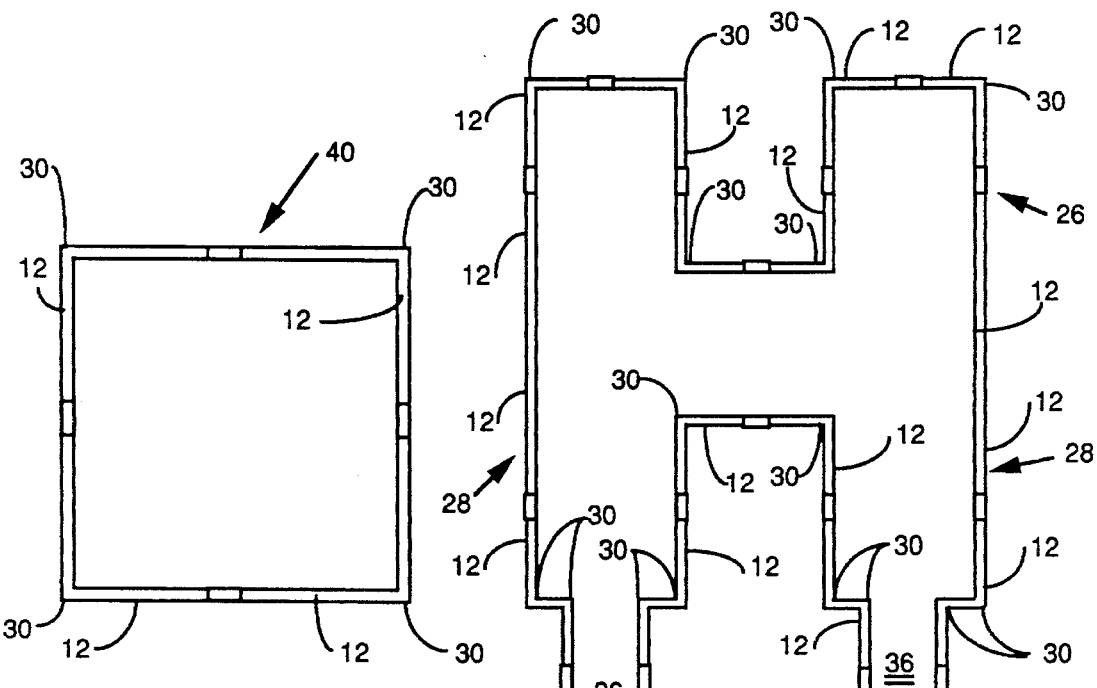
FIG. 6
FIG. 7
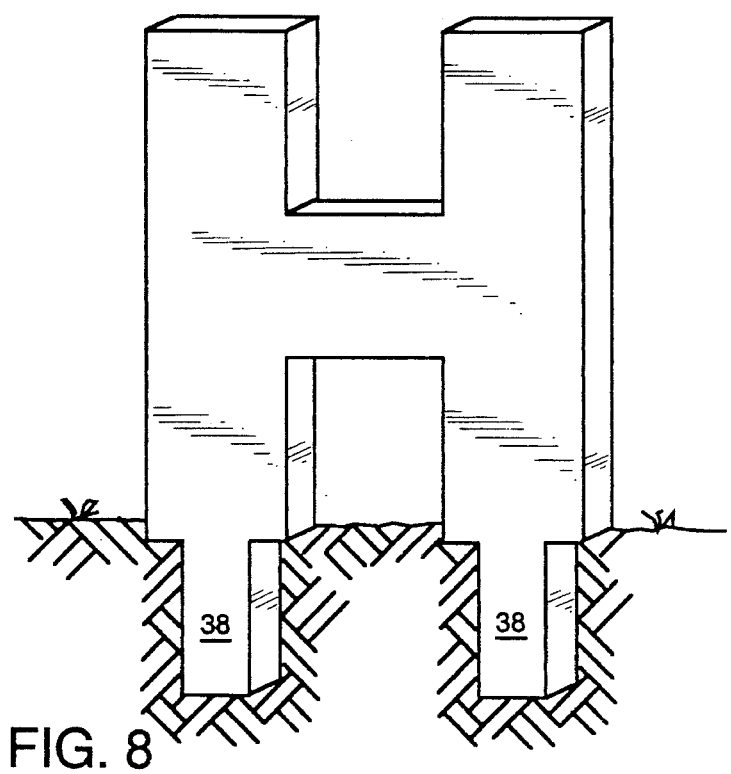
FIG. 8

METHOD FOR PREPARING FOOD PRODUCTS USING INTERCONNECTABLE PANELS

BACKGROUND OF THE INVENTION

This is a continuation-in-part of application Ser. No. 07/852,429, filed Mar. 16, 1992.

1. Field of the Invention

The present invention relates to area defining materials and, more particularly, is directed to panel assemblies that are adapted to be inserted into a receiving medium to form edging or forms for molding materials into predetermined shapes.

2. Description of the Invention Background

One type of home improvement that a homeowner can undertake to increase the value and appearance of his home is to have the surrounding property attractively landscaped. Landscaping may encompass the addition of various landscaping mediums such as lava rock, river rock, pine mulch and the like to various areas around the house and planting small plants and shrubs therein. A larger scale landscaping project might include the addition of a concrete patio or walkway.

Landscaping edging is typically used in landscaping projects to create a discrete edge or barrier between the landscaping medium and the adjacent turf. A variety of materials have been heretofore used as landscaping edging. One type of landscaping edging is formed from a generally flexible plastic material that is adapted to be received in a shallow excavation made in the turf. In addition, retaining spikes or hook-shaped retaining devices may be pounded into the turf to secure the edging in position. That type of landscaping edging typically is manufactured in rolls and has an enlarged rim formed therein to create a retaining border between the landscaping medium and the adjacent turf. While such type of landscaping edging is well adapted for creating various curvilinear boundaries between the landscaping medium and the adjacent turf, it is ill-suited for creating landscaping boarders having various angular corners and turns therein. Further, such edging is awkward to install and often becomes dislodged thereby obviating its utility.

Other types of landscaping edging may consist of more rigid members such as bricks, railroad ties and the like. Those types of landscaping edging materials can be used to create polygonal shaped borders that have relatively square or angled corners therein, but they are not well-adapted for creating curvilinear landscaping borders. For example, railroad ties cannot be used to create a circular shaped planting area.

As noted above, a homeowner's landscaping plans may also include the addition of a concrete patio or walkway. To create a concrete patio, for example, an excavation must be made to accommodate a form structure that serves to receive the concrete mix and retain it in a desired shape until the concrete has solidified or cured. Form structures for pouring concrete are typically constructed from wooden planks and plywood that are nailed together in a desired configuration. A form structure is generally constructed with substantially smooth side members so that when the concrete has cured and the form is removed, the sides of the concrete configuration will also have substantially smooth or planar sides.

Wooden form structures, however, have a number of disadvantages. In particular, if the wood is to be salvaged after the concrete has cured, the disassembly process can be very time consuming. For example, nails must be carefully pulled out of the wood to avoid splintering and the residual concrete adhering to the wood must be removed. Further, the wooden form structures, over time, begin to rot and deteriorate due to exposure to the moisture in the concrete mixture. Finally, wooden form structures are not well adapted for creating various curvilinear shapes such as circular or oval shaped members and, as such, are typically only used when polygonal shaped forms are desired.

While a variety of panel assemblies exist for creating various above ground structures or portions thereof, they generally are ill-suited for creating landscaping edging and subterranean forms for concrete projects. For example, the panel members and assemblies disclosed in U.S. Pat. No. 3,394,524, U.S. Pat. No. 3,417,519 and U.S. Pat. No. 3,898,783 are comprised of interlocking panel members that are connected together to form wall and/or roofing structures for buildings. Those panel members, for the most part, are generally rectangular in shape and have various joint configurations formed into their longitudinal edges to enable them to be positively interlocked or snapped together. However, those types of panel members, due to their non-planar shapes and joint configurations would be ill-suited for creating landscaping edging or subterranean form structures for pouring and forming concrete.

Thus, there is a need for landscaping edging material that is inexpensive, reusable, easy to install and can be installed to create curvilinear and polygonal shaped borders. There is a further need for materials for fabricating form structures for pouring and forming concrete that are also inexpensive, reusable and easy to install.

In addition, similar problems of creating a mold having a predetermined shape for creating cakes and other food items are encountered by the food preparation industry and individuals alike. For example, to produce a food item having a predetermined shape from premixed ingredients such as, for example, a cake mix, a mold having that fixed predetermined shape must be used. Such molds, however, can only be used to create cakes and other food items having that particular shape; they cannot be used to create a variety of different shaped cakes or food items. As such, one must have a mold for each shape desired. Moreover, such different shaped cake pans typically cannot be "nested" for storage purposes and, therefore, a great amount of storage space is need to store a variety of pans.

Moreover, prior cake baking pans are typically formed with sloping sides so that the cake will essentially "fall" from the pan upon the inversion thereof. The resulting cake, however, has sloping sides. Therefore, such cake pans are ill-suited for baking cakes having vertical sides. Also, prior cake baking pans are ill-suited for forming delicate cakes wherein the pan must be carefully removed from the cake to avoid damaging the exterior surface thereof. One type of cake baking pan, however, comprises a continuous metal ring that can be selectively expanded for removal thereof from the finish cake, by a releasable clasp. Such baking pans, however, are limited to having a substantially circular shape.

Still other problems are associated with prior baking pans that are formed in predetermined shapes. For example, such pans typically cannot be formed with sharp intersecting edges due to the difficulty of removing the cake therefrom.

As such, there is also a need for a foodstuff mold that is reusable and capable of being selectively formed into a variety of predetermined shapes. There is a further need for a foodstuff mold having the above-mentioned attributes that can easily be removed from the molded product with little or no damage to the product. There is a further need for a foodstuff mold that is capable of forming foodstuffs into predetermined shapes having relatively sharp corners.

SUMMARY OF THE INVENTION

In accordance with the present invention, there is provided a panel assembly adapted to form landscaping edging or barriers, forms for pouring and forming concrete, and molds for preparing a food product from a moldable mixture of ingredients in a predetermined shape. The panel assembly may also be used to prevent soil erosion on sloping embankments.

The panel assembly consists of a plurality of substantially planar panel members that are adapted to be slidably interconnected together along their edges. Each panel member has a first offset and hook-shaped sleeve formed into one of its longitudinal edges and a second offset and hook-shaped sleeve formed into its other longitudinal edge. To connect the panels together, the first sleeve of one panel member is received in sliding engagement with the second sleeve of an adjacent panel member. In addition, each panel member has a series of shallow, longitudinally extending creases therein to provide the panel members with sufficient strength and rigidity to enable them to be longitudinally inserted into the soil with minimal bending or distortion thereof.

The panel members of the present invention are adapted to be longitudinally inserted into the soil to create a desired barrier by pounding the top edge thereof with an ordinary hammer. Thereafter, if desired, they may be individually removed from the soil and reused by grasping the top edge of a panel member and pulling upward until that member has slidably disengaged the adjacent panel member or members.

Also, polygonal or other shaped barriers and forms may be created by longitudinally bending the panel members along their creases to a desired angular shape before they are interconnected and inserted into the soil. The panel members may also be interconnected and inserted as a series of terraces on a sloping embankment to prevent soil erosion therefrom.

The panel members of the present invention, when used in connection with a flat baking pan, are also particularly well adapted for creating molds for preparing moldable foodstuffs in predetermined shapes.

Accordingly, the present invention provides apparatus and methods for creating landscaping barriers and forms for pouring concrete that may be installed in a variety of curvilinear and angular shapes. Also, the panel members of the present invention are inexpensive, reusable and relatively easy to install and remove. However, other details, objects and advantages will become apparent as the following detailed description of the present preferred embodiment thereof proceeds.

BRIEF DESCRIPTION OF THE DRAWINGS

In the accompanying drawings, I have shown a present preferred embodiment of the invention wherein like reference numerals are employed to designate like parts and wherein:

FIG. 6 is a top assembly view of a square form or planting area created with the panel members of the present invention;

FIG. 7 is a top assembly view of an alternative form created with the panel members of the present invention;

FIG. 8 is a perspective view of the item created from the form illustrated in FIG. 7;

DETAILED DESCRIPTION OF THE PREFERRED EMBODIMENTS

Figure 1:
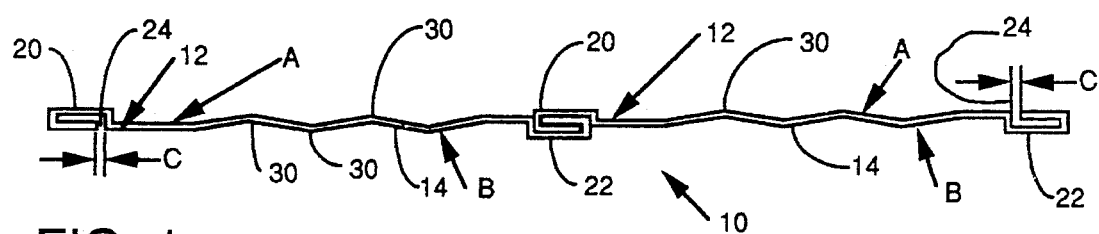
FIG. 1 is an end assembly view of the panel members of the present invention.

Referring now to the drawings for the purposes of illustrating the present preferred embodiment of the invention only and not for purposes of limiting the same, the Figures show a panel assembly generally designated as 10 that may be used to create barriers for landscaping borders and forms for pouring and forming concrete.

More particularly and with reference to FIG. 1, there is shown a panel assembly 10 that consists of interconnected panel members 12 that are preferably fabricated from 24 gauge aluminum or steel sheet material. It will be appreciated, however, that panel members 12 may be fabricated from other materials having varying thicknesses and rigidity that will enable them to be used in the manners further described below. In addition, a panel member 12 preferably has a rectangular shape (e.g., 10"×4.5"); however, it will be further appreciated that the panel members may also be provided in other sizes and shapes such as, for example, squares. The skilled artisan will readily appreciate that the phrase "substantially planar", as used herein to describe a preferred panel member that has a height-to-width ratio of not more than approximately four percent. For example, the panel member described above has an overall height of approximately 0.15" and a width of approximately 4.5". Such panel member's height/width ratio equals 0.15"/4.5" or approximately four percent. It will be appreciated that by using the above-described height-to-width ratio, a number of different sizes of substantially planar panel members may be constructed. It will be further appreciated that the phrase "substantially planar" as used herein, is not intended to be limiting, but is used to describe the particular attributes of the panels of the present invention that permit them to be readily inserted into a receiving medium and to thereby create a substantially smooth and visually appealing barrier.

Figure 4:
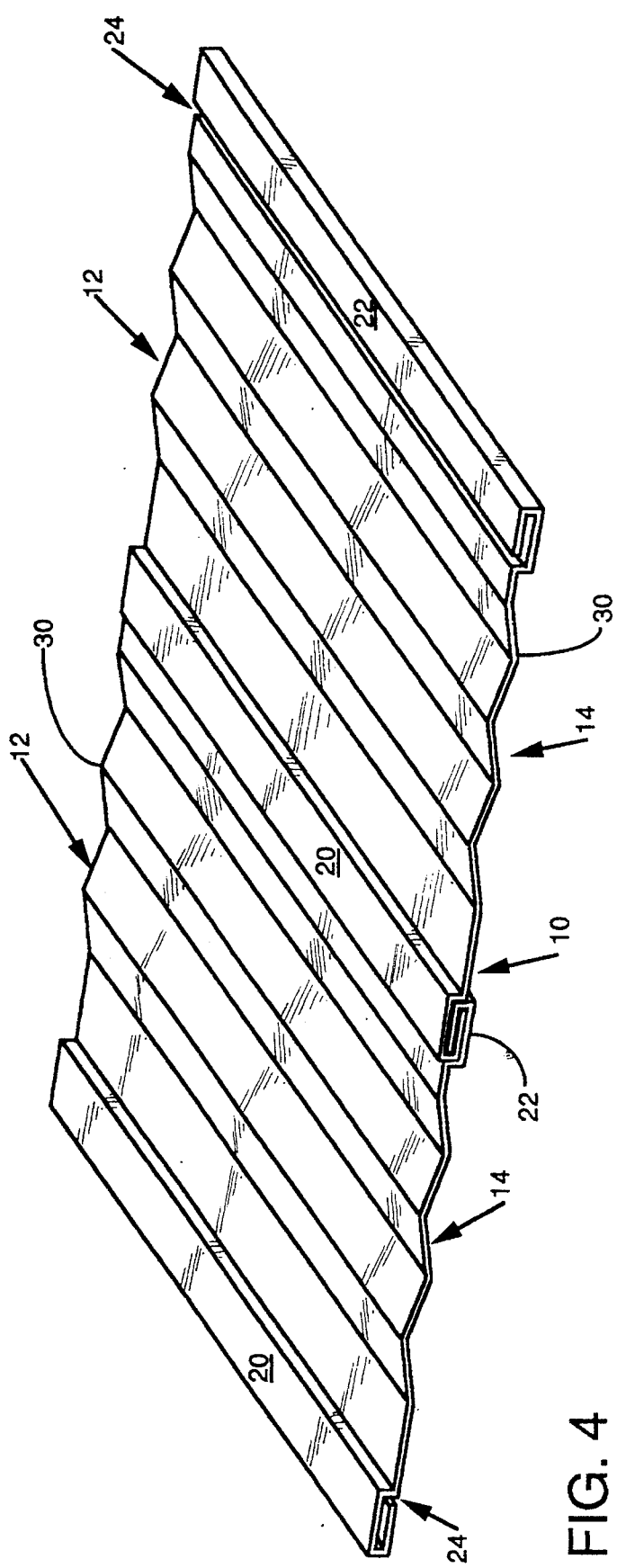
FIG. 4 is a perspective assembly view of two interconnected panel members of the present invention.

Each panel member 12 has an elongated central portion 14 that is bounded on each longitudinal side by sleeve members 20 and 22. In the preferred embodiment, sleeve members 20 and 22 are preferably formed by bending the longitudinal edges of the central portion 14 in the shape depicted in FIG. 1. As can further be seen in FIG. 1, sleeve 20 is preferably perpendicularly offset slightly (e.g., 0.15") from side "A" of the panel member 12 by providing element 20a and sleeve 22 is also preferably perpendicularly offset slightly (e.g., 0.15") from side "B" of the panel member 12 by providing element 20b. It will be appreciated, however, that the perpendicular bends in panel members 12 forming the sleeve members 20 and 22, respectively, are preferably formed as radiused bends. Each of the sleeves 20 and 22 have an opening 24 therein that longitudinally extends the length of the panel member 12 and has a width "C" (e.g., 0.078") that is larger than the thickness "D" (e.g., 0.024") of the panel member 12 (See FIGS. 1 and 4). It will be appreciated by those of ordinary skill in the art, that the sleeves 20 and 22 may be created separate from the central portion 14 and then fastened thereto by, for example, welding or riveting.

Figure 2:
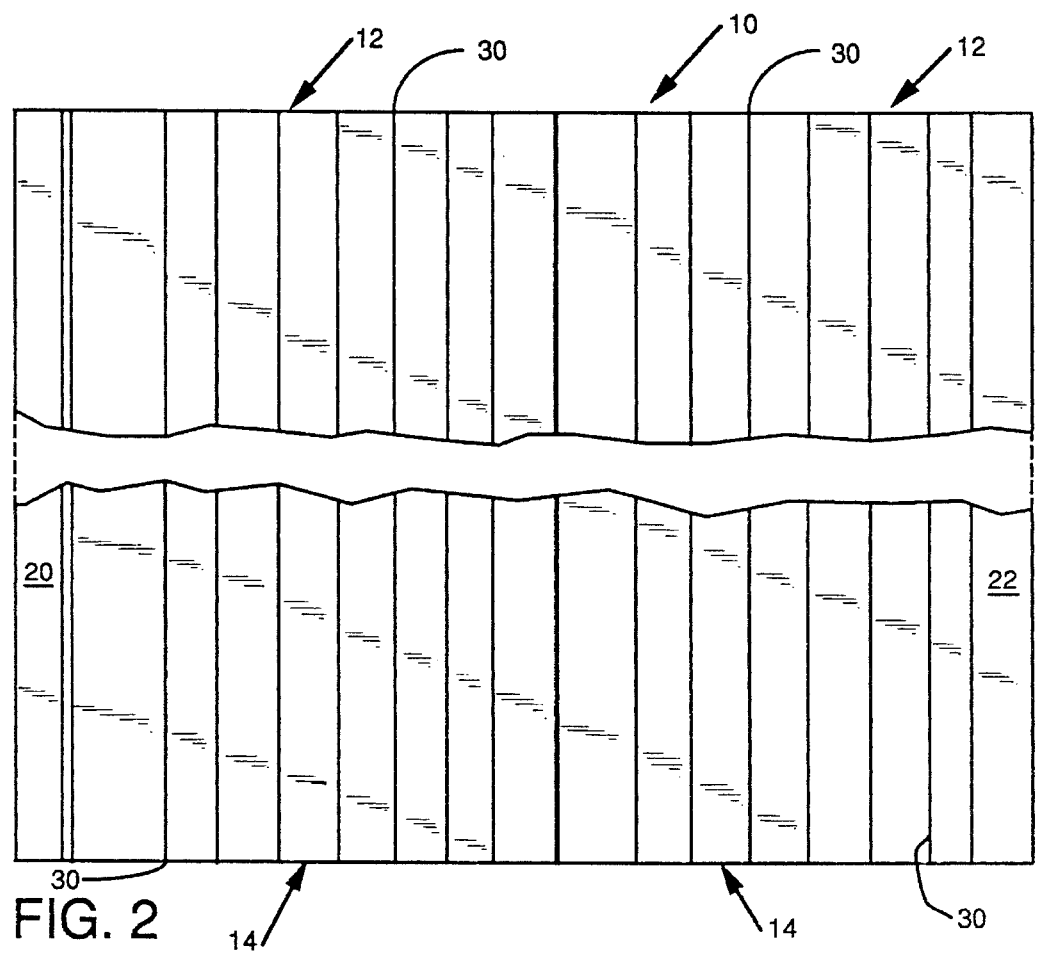
FIG. 2 is a front assembly view of the panel members of the present invention.
Figure 3:
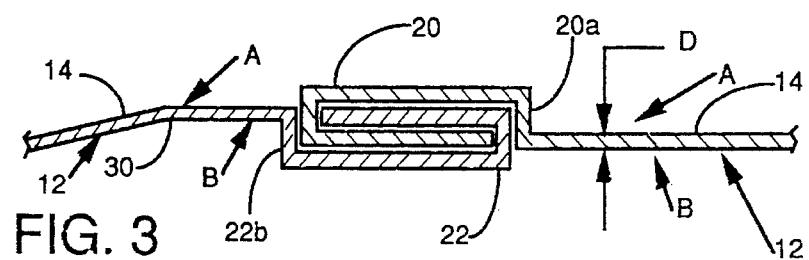
FIG. 3 is a cross-sectional view of the joint assembly of the panel members of the present invention.

In addition, to provide the panel members 12 with additional strength and rigidity, the central portion 14 of each panel member 12 has a plurality of shallow (depth of e.g., 0.15") longitudinally extending creases 30 therein (See FIGS. 1 and 2). While I prefer to include at least six longitudinally extending creases 30 in the central portion 14 of each panel member 12, it will be understood that any number of creases 30 may formed into each central portion 14 to provide each panel member 12 with additional rigidity and strength.

The panel members 12 are interchangeable and are adapted to be slidably interconnected as shown in FIGS. 1–4. More specifically, the sleeve 20 of one panel member 12 is received in sliding engagement with the sleeve 22 of an adjacent panel member 12. When fastened together in that manner, the panel members 12 may not be latitudinally separated. However, the panel members 12 may be slidably longitudinally separated. As can be seen in FIG. 1, the panel member assembly, generally designated as 10 is substantially planar and, as such, is well suited for longitudinal insertion into the soil.

The panel members 12 of the present invention have a variety of uses. In particular, the panel members 12 may be connected together to form landscaping edging that has a variety of curvilinear and angular turns therein or it may be used to create forms for pouring and forming concrete. In addition, the panel members may also be used to create concrete letters and symbols for above-ground signs. Also, when properly used, the panel members 12 can be used to prevent soil erosion.

Figure 5:
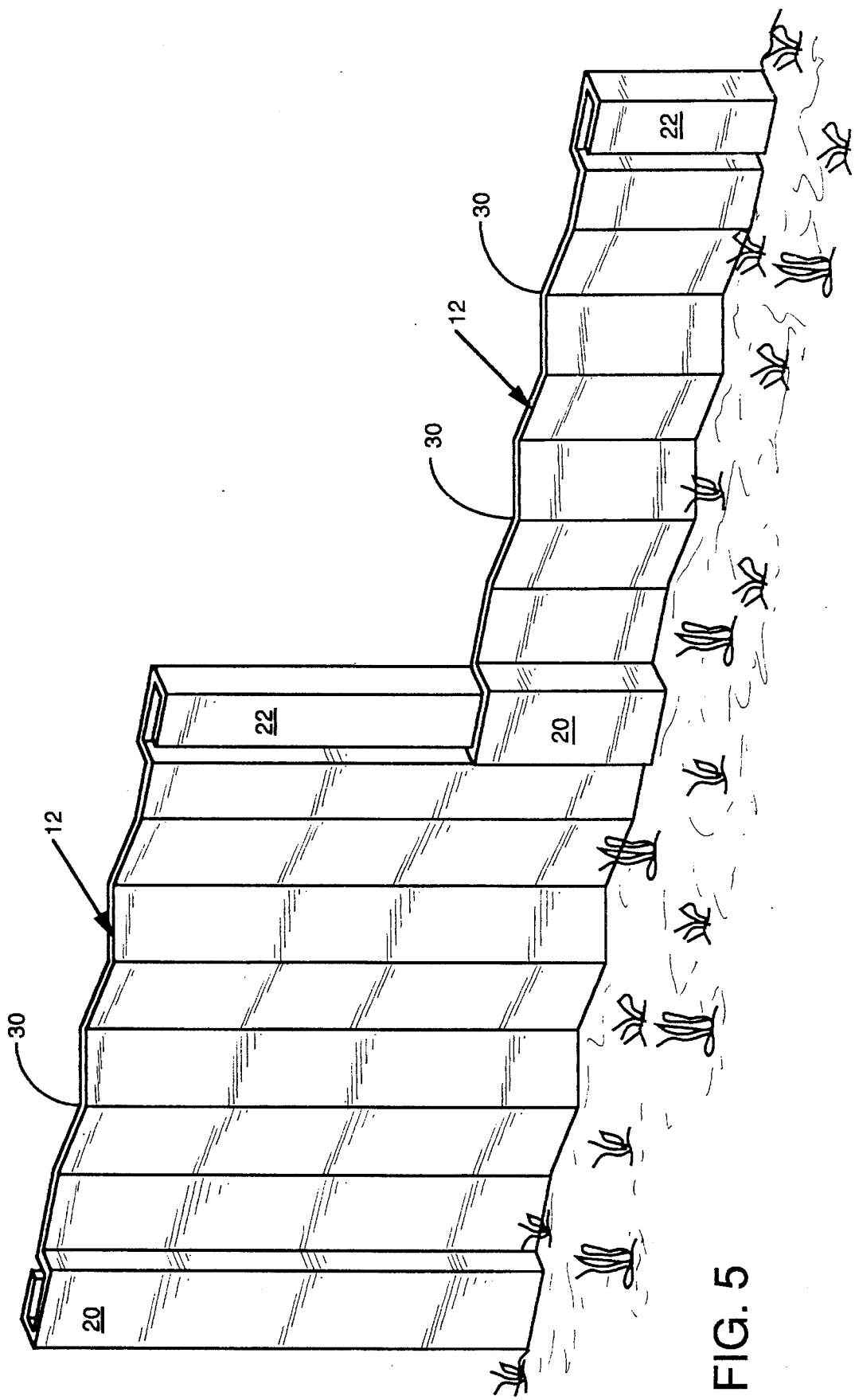
FIG. 5 is a perspective assembly view illustrating the insertion of the panel members of the present invention into the turf.

To use the panel members 12 as landscaping edging, a first panel member 12 is inserted into the soil as shown in FIG. 5. To begin the insertion process, a small board is placed over the top edge of the panel member 12 and the board is then struck with a hammer thereby causing the panel member 12 to enter the soil. It will be appreciated that the board serves to prevent the hammer from damaging the top edge of the panel member 12 during the insertion process. It will be further appreciated that other materials may also be used to prevent the panel members 12 from being damaged while being hammered into the soil. After the first panel 12 has been inserted into the soil a desired distance, a second identical panel member 12 is slidably attached to the first panel member 12 in the manner described above. Thereafter, the second panel member 12 is also hammered into the soil. This process is then repeated until landscaping edging having the desired length and shape is achieved. It will be further appreciated that the height of the landscaping edging may be varied by varying the distance that the panel members 12 are inserted into the soil.

Each panel member 12 may be individually removed simply by grasping the portion of the panel member 12 that extends above the ground level with, for example, a pair of pliers and pulling upward until the panel member 12 slidably disengages the adjacent panel member or members 12. When removed in this manner, the panel members 12 may be reused in other landscaping jobs.

As mentioned above, the panel members 12 of the present invention may be used to create a variety of differently shaped landscaping borders. For example, the panel members 12 may be installed in the above-described manner to create an oval or circular planting area or other curvilinear landscaping borders. In addition, the panel members 12 of the present invention may also be used to create a variety of angular shapes such as, for example, squares, rectangles, triangles and stars. When shapes having gentle curves are desired, the play between sleeves 20 and 22 may be sufficient to provide the shape without necessitating bending of panel members 12.

To create a landscaping border or planting area that has angular corners or shapes therein, the panel members 12 are longitudinally bent along their creases 30 to the desired angular shape before being inserted into the soil in the above-described manner. FIG. 6, illustrates a square-shaped planting area generally designated as 40 that is formed out of the panel members 12 of the present invention. To form the square area 40, the four panel members 12 that form the corners of the square area 40 are longitudinally bent along one of their creases 30. It will be appreciated that by bending the panel members 12 along one or more of their creases 30 a variety of angular shapes may be created.

The panel members 12 may also be used to create forms for pouring and forming concrete. To create a form for pouring a concrete patio or sidewalk, the panel members 12 may be installed in the above-described manner to create a closed perimeter or barrier having the desired shape of the patio or walkway. If the concrete form is to extend below the ground level, the installer may remove the earth contained within the form to the desired depth making sure that the panel members 12 remain sufficiently embedded into the soil to retain the form in position. If, on the other hand, the installer desires to pour the concrete on top of the ground level, no excavation is needed. It will be appreciated that when fastened together as described above, the panel members 12 form a shape that will retain concrete mixes therein. In addition, I have found that by spraying the sides of the panel members 12 that will contact the concrete with commercially available silicon spray prior to pouring the concrete therein, the panel members 12 may be easily disassembled with little or no concrete residue remaining thereon. After the concrete has solidified or cured, the panel members 12 may be disassembled in the same manner as was described hereinabove.

The panel members 12 are also well adapted to create three dimensional concrete letters for signs and the like. By means of example, as shown in FIG. 7, a letter "H" may be formed from concrete by first creating a form 26 in the shape of a letter "H" letter with panel members 12. It will be appreciated that the panel members 12 may be bent along their longitudinal creases 30 to form the desired angles or corner portions of the letter. Thereafter, the panel members 12 are then inserted into the soil in the manner described above to create the form 26. A portion of each panel member 12 is permitted to extend above the ground for a distance that is equivalent to the desired thickness of the concrete letter. In addition, tab areas 36 are preferably provided in the bottom of the form 28 for creating tab members 38 on the bottom of the concrete letter "H" for installation purposes.

The concrete is then poured into the form 28 and is thereafter permitted to cure. After the concrete has cured, the panel members 12 are removed in the manner described above. The resulting concrete letter "H" may then be installed as shown in FIG. 8 by raising the formed concrete shape and embedding the tab members 38 into the soil or a concrete pad (not shown). It will be appreciated that a variety of three dimensional letters, logos, and designs may be created in this manner.

Figure 9:
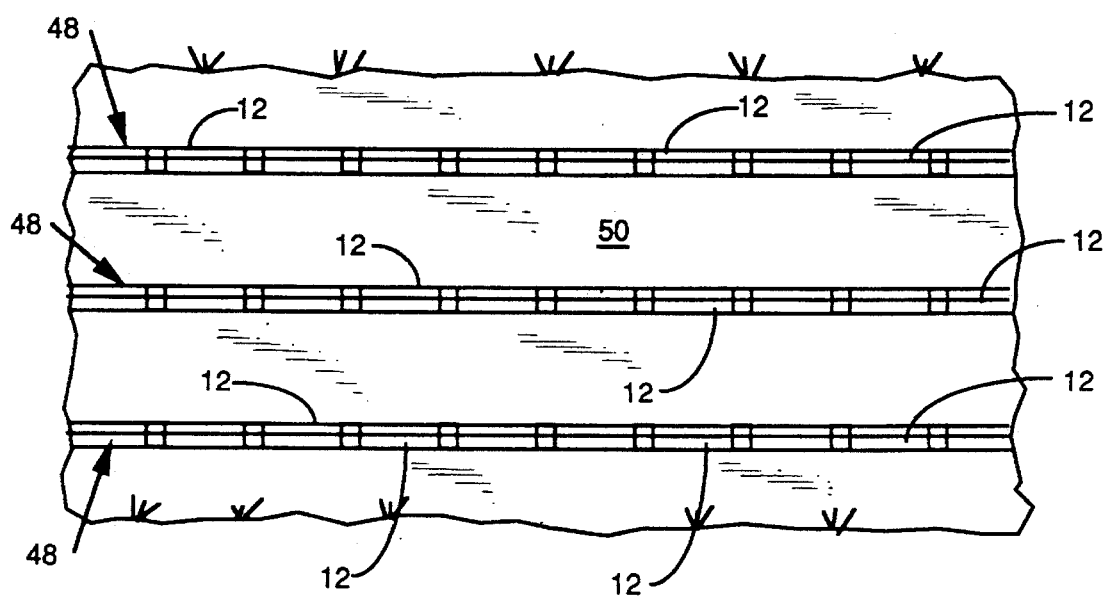
FIG. 9 is a front elevational view of an alternate use of the panel members of the present invention.
Figure 10:
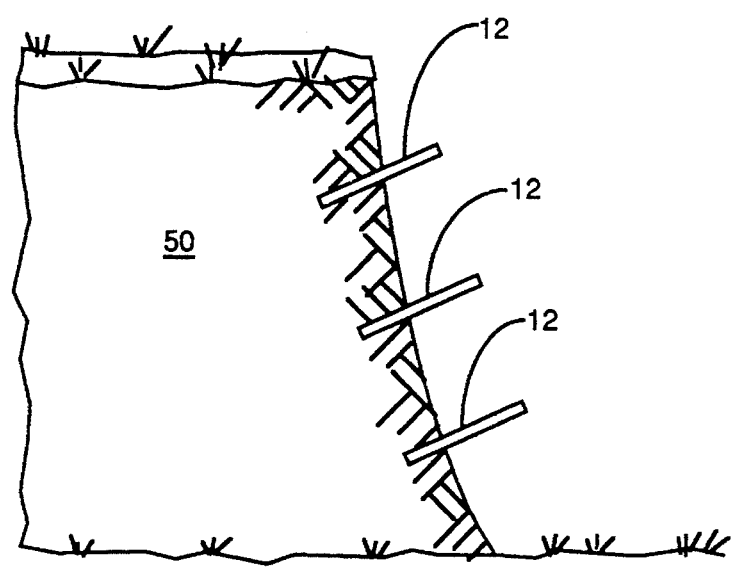
FIG. 10 is a cross-sectional elevational view of the embankment of FIG. 9.

The panel members 12 of the present invention may also be used to prevent soil erosion commonly encountered on sloping embankments that have little or no vegetation growing thereon. For example, the panel members 12 may be slidably interconnected together and longitudinally inserted at an angle into the side of a sloping embankment 50 as illustrated in FIGS. 9 and 10. When installed in that manner, the panel members 12 form an elongated barrier generally designated as 48 which serves to prevent water from eroding the side of the embankment 50. As shown in FIGS. 9 and 10, a number of panel assemblies 48 are preferably installed into the sloping embankment 50 in the above described manner.

Thereafter, when a sufficient amount of vegetation has grown onto the side of the embankment to prevent further erosion, the panel members 12 may optionally be removed and reused.

Figure 11:
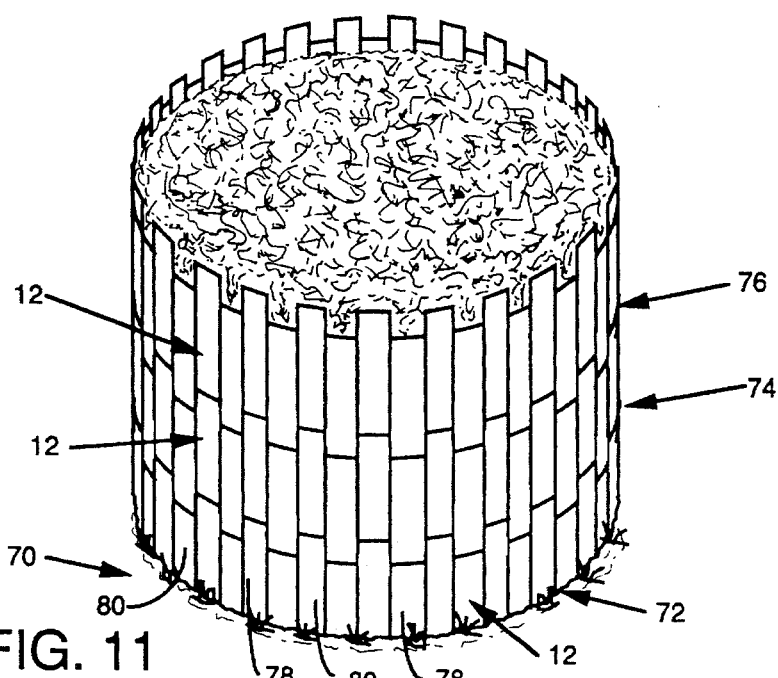
FIG. 11 is a elevational perspective view of an alternate use of the panel members of the present invention.

I have also found the panel members 12 of the present invention to be particularly well suited for creating open ended receptacles and extended wall sections. In particular, as shown in FIG. 11, an initial row of panel members 12, generally designated as 72, are slidably interconnected and inserted into the soil in such a manner so as to create the desired shape of an open ended receptacle 70. In this embodiment, every other panel member of row 72, depicted by the numeral 78, is inserted into the soil a distance that is preferably one-third greater than the distance that the adjacent panel members, depicted as 80, are inserted. It will be appreciated that such adjacent panel members 80 may, alternatively, not even be embedded in the soil. Thereafter, a second row 74 and even a third row 76 of panel members may be slidably interconnected together as shown in FIG. 11. It will be appreciated that any number of additional rows of panel members may be added to extend the height of the receptacle as so desired. It will be further appreciated that the receptacle 70 has a variety of uses such as, for example, functioning as an above-ground planter or compost storage bin. When used as a compost storage bin, I have found that as the compost pile is depleted, the upper rows of panel members 12 may be removed thus providing easy access to the compost remaining therein. Also, the panel members 12 may be interconnected together to form a barrier wall around, for example, plants and trees. When used in that manner, the panel members 12 serve to protect the plants and trees from the wind and small animals.

An additional advantage of the present invention is that once panel members 12 are joined together they can be formed into neat and smooth curves with no hinging action at the connection joint. Indeed, curves of either direction may be formed without the joint snapping apart as would occur if a hinge action occurred at the linkage point. However, the joint of the present invention would nonetheless allow for sliding interconnection of panel members 12.

Figure 12:
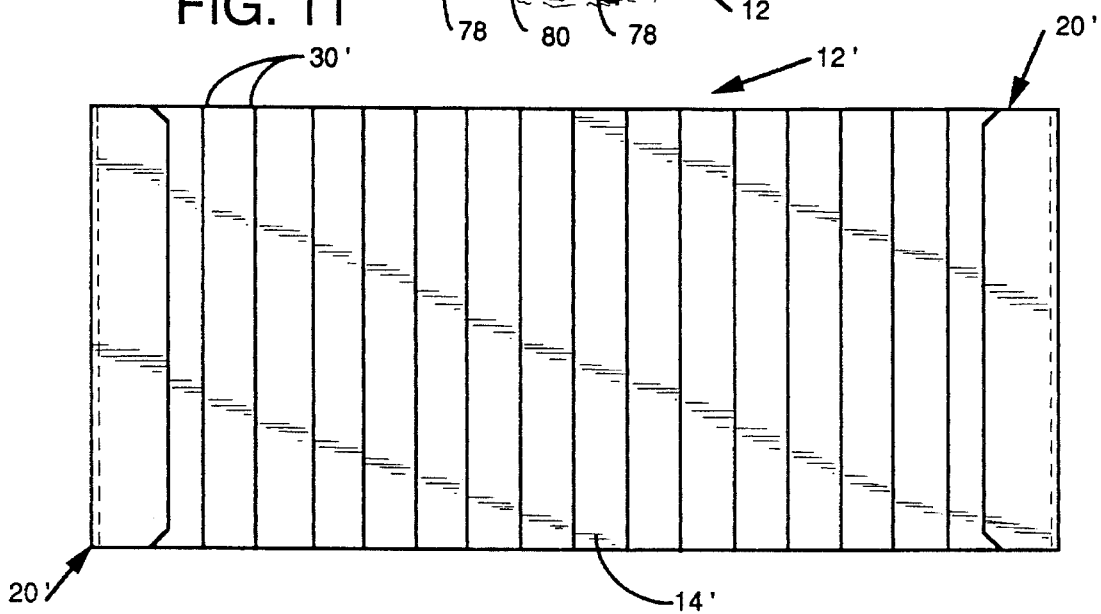
FIG. 12 is a side elevational view of another panel member of the present invention.
Figure 13:
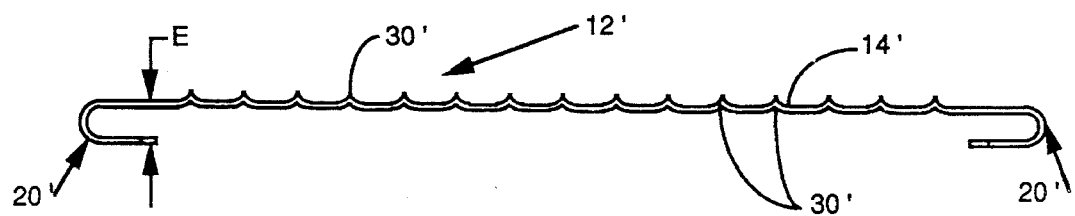
FIG. 13 is a top view of the panel member of FIG. 12.

The panel members of the present invention are also particularly well adapted for creating forms for baking a variety of different shaped cakes or for preparing other food products for which a molding form may be used. In one embodiment, the panel members 12' are preferably formed as show in FIGS. 12 and 13. Preferably each panel 12' is rectangular shaped (i.e., 4.5"×2") and is formed from a non-corrosive sheet material such as, for example, 24 gauge sheet aluminum. The skilled artisan will appreciate, however, that the panel members 12' may also be fabricated in a myriad of different shapes and sizes from a variety of other non-corrosive, non-toxic materials that can withstand typical baking temperatures. As can also be seen in FIGS. 12 and 13, each panel member 12' has an elongated central portion 14' that is bounded on each end by longitudinal hooks 20'. In a preferred embodiment, hooks 20' are preferably formed by bending the edges of the central portion 14' in a radius as most particularly illustrated in FIG. 13. Preferably, each hook member 20' is bent in such a manner so as to provide a opening "E" of approximately 0.125" that extends between the end of each hook member 20' and the central portion 14'. In the alternative, the hook member 20' may be formed such that the end thereof contacts the central portion to define an opening having a preferred diameter of 0.125". However, as will become evident to the skilled artisan as the detailed description proceeds, opening "E" may be varied to accommodate different fastening members for interconnecting the panels 12' together.

Also in a preferred embodiment, I prefer to provide shallow (i.e., 1/16" deep) creases 30' in the central elongated portion 14' of each panel member 12'. Preferably, the creases 30' are interspaced at 0.25" intervals in the manner shown in FIG. 12. However, the creases 30' may be omitted or provided in a variety of other spaced arrangements. I have found that the creases 30' assist in bending the panel member 12' in a desired shape and, if provided in the manner shown in FIGS. 12 and 13, serve to prevent the panel from bending at a skewed angle.

To removably interconnect the panel members 12' in an end-to-end relationship, a splicing clip 100 is preferably used. I prefer to fabricate the splicing clips 100 from 0.125" diameter plated steel wire fashioned in the shape illustrated in FIG. 14. More specifically, the splicing clips 100 may be fabricated from a stainless steel or similar non-corrosive, nontoxic metal wire that is capable of withstanding typical baking temperatures. I have also found that splicing clips 100 can be fabricated from carbon steel wire that is plated with a non-corrosive material such as, for example, chrome that can also withstand typical baking temperatures.

Figure 14:
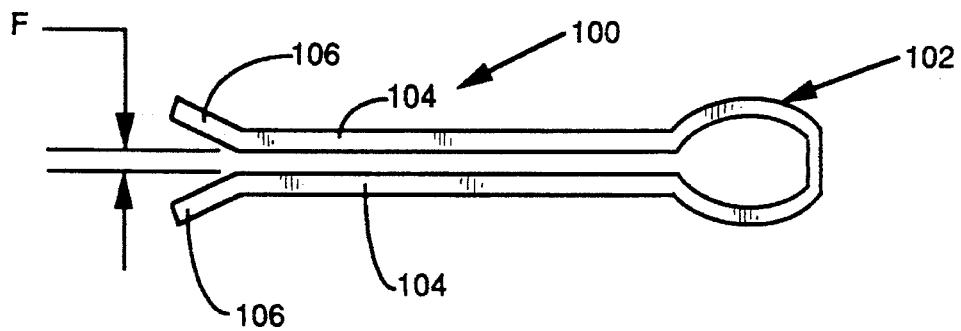
FIG. 14 is a side view of a splicing clip of the present invention.

As can be seen in FIG. 14, each splicing clip 100 has a rounded handle portion 102 and two substantially parallel connection legs 104. In a preferred embodiment, the distance "F" between the legs 104 is equal to approximately twice the thickness of the material comprising the panel members 12'. However, depending upon the flexibility of the material comprising the splicing clip 100, legs 102 can be arranged such that they abut each other. In addition, to aid in the insertion of the splicing clip 100 into the hook members 20' the outer ends 106 of the legs 104 are preferably slightly angled outward as shown in FIG. 14. The reader will readily appreciate that the splicing clip 100 serves to provide a hingable joint upon which the panel members 12' may be pivoted to form relatively sharp angles.

Figure 15:
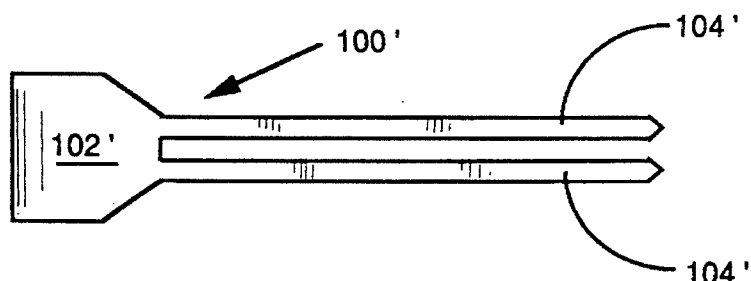
FIG. 15 is a side view of another splicing clip of the present invention.

Another spicing clip 100' is illustrated in FIG. 15. Splicing clip 100' is preferably fabricated from 0.125" thick sheet aluminum material in the shape shown in FIG. 15. The skilled artisan will readily appreciate, however, that the splicing clip 100' can be fabricated from a variety of different non-toxic, non-corrosive materials. As can be seen in FIG. 15, splicing clip 100' has a handle member 102' and two downwardly extending legs 104'. The legs 104' are preferably approximately 0.125" wide and preferably have a 0.125" space therebetween.

Figure 16:
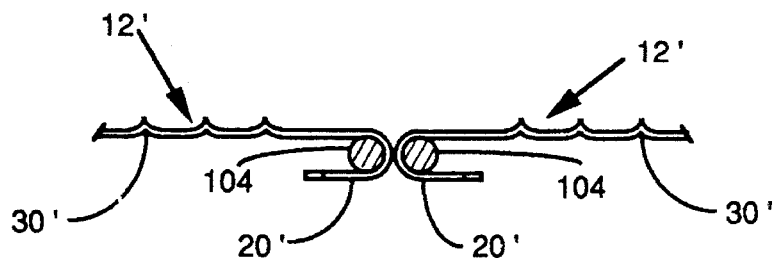
FIG. 16 is a top view of a panel member assembly with the splicing clip legs shown in cross-section.
Figure 17:
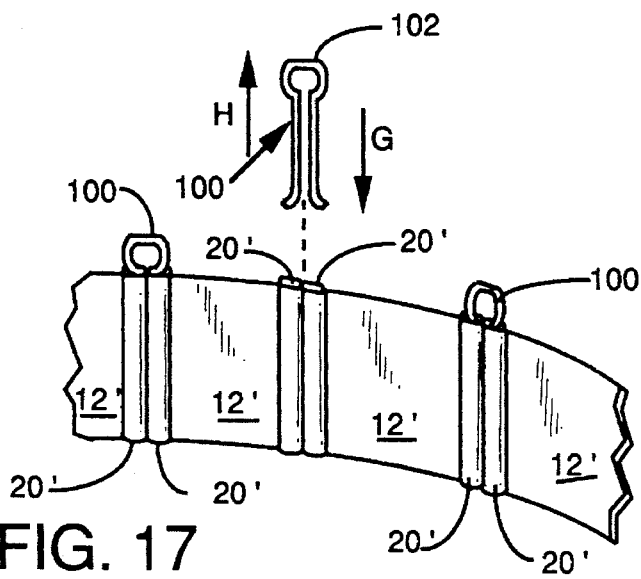
FIG. 17 is a perspective view of an assembly of panels of the present invention.

The interconnection of the panel members 12' will now be explained with reference to FIGS. 16 and 17. As can be seen in those Figures, the hook member 20' of one panel member 12' is abutted against a hook member 20' of an adjacent panel member 12' and the legs 104 are inserted into the openings "E" of the adjacent hook members 20'. The legs 104 are then further advanced into the openings "E" by pushing on the handle 102 in the direction depicted by arrow "G" in FIG. 17. The splicing clip 100 can be removed simply by grasping the handle portion 102 and pulling it in the direction depicted by the arrow "H". As the detailed description continues, the reader will appreciate that the above-described splicing clips 100 in connection with the panel members 12' are well suited for creating various different shaped molds for baking delicate cakes, because such connection arrangement enables the panels to be "peeled" away from the cake without damaging the sides thereof. Preferably, the panels 12' are interconnected such that the hook members 20' are arranged to the outside to create a form having a relatively smooth interior surface. The reader will also appreciate that the above-described splicing clips 100 can also be used in connection with the previously described panel members 12 to enable them to be quickly interconnected together in the manner described immediately above.

Figure 18:
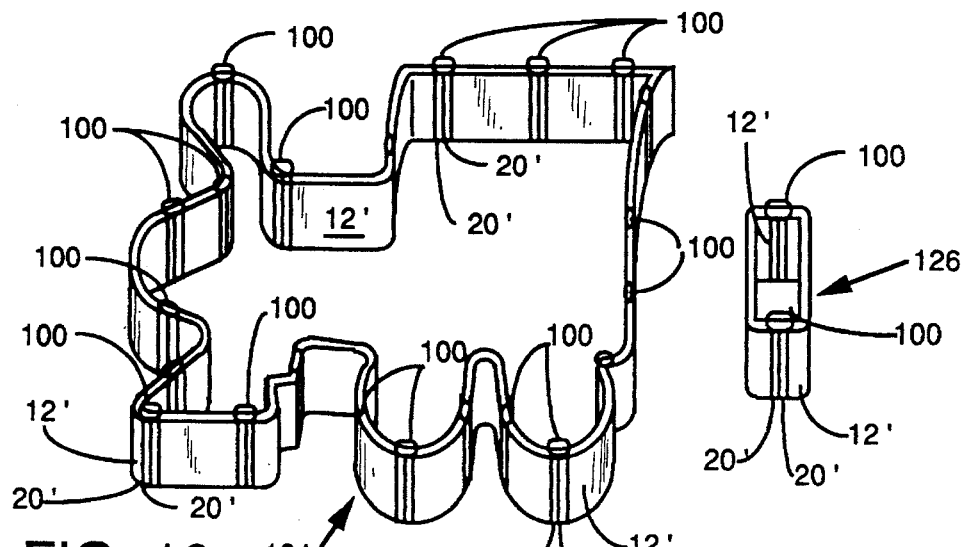
FIG. 18 is a perspective view of assemblies of panels of the present invention formed in the shape of a locomotive and window therefor for creating a form for baking a cake having the shape of a locomotive with a window opening therein.
Figure 19:
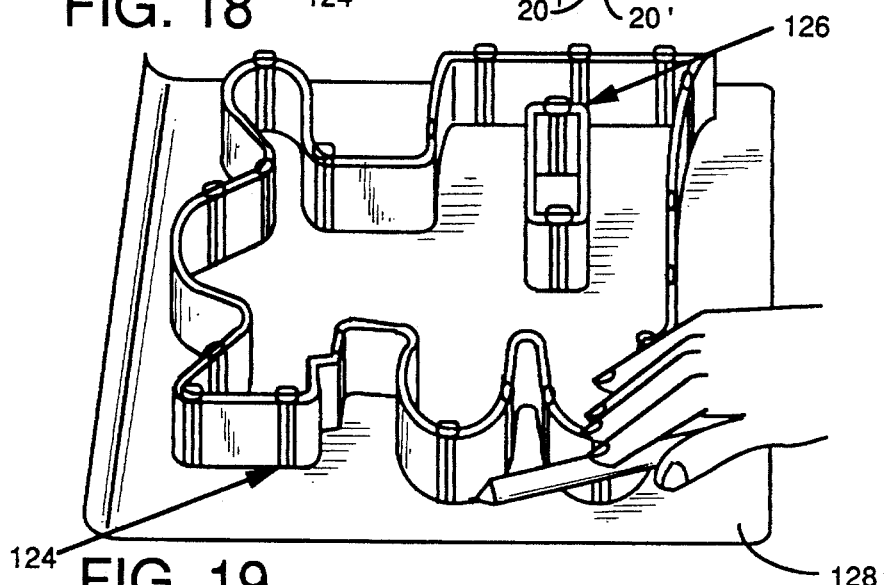
FIG. 19 is a perspective view of the assemblies of FIG. 18 received on a flat baking pan and being traced therearound with a non-toxic marker to form outlines of the assemblies of FIG. 18 on the baking pan.

FIGS. 18–22 illustrate a preferred method of using the panel members 12' to bake a cake having the shape of a locomotive. The skilled artisan will further appreciate, however, that the method depicted in FIGS. 18–22 and described immediately below can be used to create cakes of all shapes and sizes. The panel members 12' can be bent into a variety of different configurations and interconnected to form various predetermined shapes that have been laid out on graph paper having, for example 1"×1" squares. In particular, the desired shape is first drawn on the graph paper and thereafter each panel member 12' is set on one of its long edges along a portion of the graphed shape and bent to the desired configuration. As can be seen in FIG. 18, the method then includes bending each panel member 12' in a desired shape and slidably interconnecting the panel members 12' in the manner as was described above to create a locomotive-shaped form, generally designated as 124 and a window-shaped form 126. After the panel members 12' have been bent to the desired shape, they are slidably interconnected at their edges in the manner described hereinabove to form the forms 124 and 126.

Once the predetermined cake forms (124, 126) have been assembled as shown in FIG. 18, the forms (124, 126) are placed edgewise on a member having a smooth planar surface, such as a baking pan or cookie sheet 128. After the forms (124, 126) have been placed upon the cookie sheet 128, the forms (124, 126) are traced around the perimeter thereof with a nontoxic marker and are then removed therefrom to reveal the outline of the forms (124, 126), generally indicated as 130, on the cookie sheet 128. See FIGS. 19 and 20.

Figure 20:
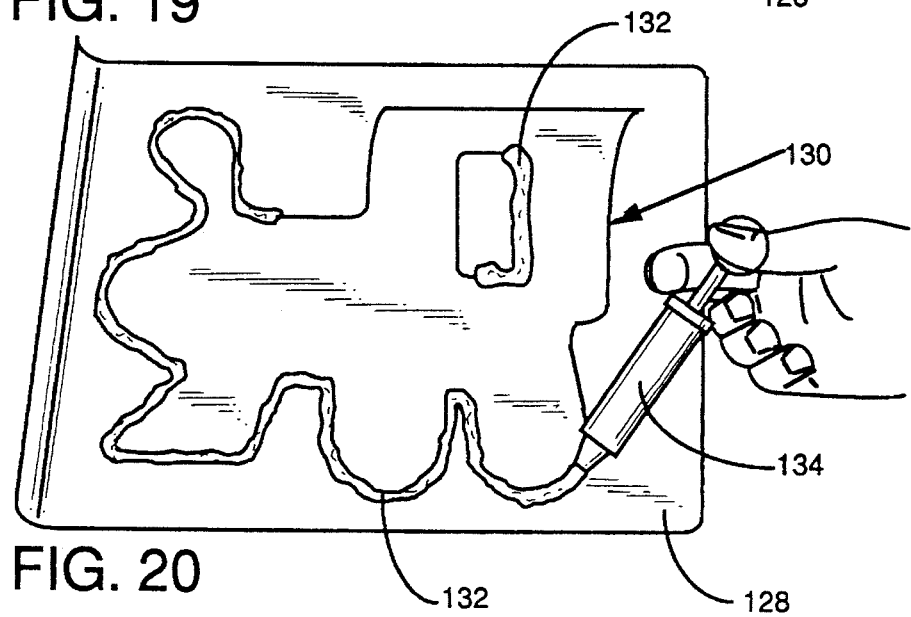
FIG. 20 is a plan view illustrating the application of a sealant to the baking pan along the outline of FIG. 18.

The next step in this process is to create a non-toxic sealant material for sealing the forms (124, 126) to the cookie sheet 128 to prevent leakage therefrom. For cake baking purposes, I prefer to use a viscous mixture of flour and water (i.e., 1 part water to 1 part flour) to create a seal between the forms (124, 126) and the cookie sheet 128. More specifically, after the flour and water sealant has been mixed, a bead 132 of sealant material is preferably applied to the cookie sheet 128 such that half of the bead 132 extends inside of the outline 130 and the other half of the bead 132 extends outside of the outline 130 in the manner illustrated in FIG. 20. Preferably, the sealant bead 132 is at least ½" wide and ⅜" thick; however, it will be appreciated that a variety of other bead 132 configurations may also be successfully used. As can be seen in FIG. 20, for cake baking purposes, the sealant bead 132 may be applied by an icing dispenser 134.

After the sealant bead 132 has been placed around the entire outline 130 (for both forms 124 and 126), the forms (124, 126) are placed onto the cookie sheet 128 such that they are received in the sealant bead 132. It will be understood that forms (124, 126) are placed on the cookie sheet 128 such that they are centered on the sealant bead 132. After the forms (124, 126) have been placed on the cookie sheet 128 in the above-described manner, the sealant bead 132 should preferably be inspected to ensure that fluid-tight seals have been created around the entire perimeters of each form (124, 126). Such inspection may be accomplished by ensuring that no airspace exists between the forms (124, 126) and the cookie sheet 128. If an airspace is detected, the sealant bead 132 may be smoothed out with a finger or utensil to fill in the airspace or more sealant material may be added.

After the sealant bead 132 has been inspected, the cookie sheet 128 and the forms (124, 126) in an assembled form, generally designated as baking form 134, is baked in an oven that has been preferably pre-heated to approximately 350 degrees for a preferred period of 10 minutes and is then removed therefrom. Such temperature and baking time causes the sealant bead 132 to somewhat solidify to create a substantially fluid-tight seal between the forms (124, 126) and the cookie sheet 128. The skilled artisan will appreciate, however, that other temperatures and baking periods may be used to cause the sealant bead 132 to form a substantially fluid-tight seal between the forms (124, 126) and the cookie sheet 128.

The skilled artisan will appreciate that the above-described tracing step may be omitted by placing the forms 124 and 126 in their desired positions on the cookie sheet 128 and thereafter applying a sealant bead 132 between the forms 124 and 126 at the point where they meet the cookie sheet 128 to achieve a fluid tight seal therebetween. After the sealant bead 132 has been applied around the entire perimeter of forms 124 and 126, it should be visually inspected to ensure that no light can be detected passing between the forms 124 and 126 and the cookie sheet 128. If light is detected passing between a form (124, 126) and the cookie sheet, the sealant bead 132 can be pressed into the intersection between the form (124, 126) and the cookie sheet by running a finger or utensil along the sealant bead 132 and pressing the sealant into the intersection between the form (124, 126) and the cookie sheet 128. The remaining steps in the cake baking process are identical and are described below.

Figure 21:
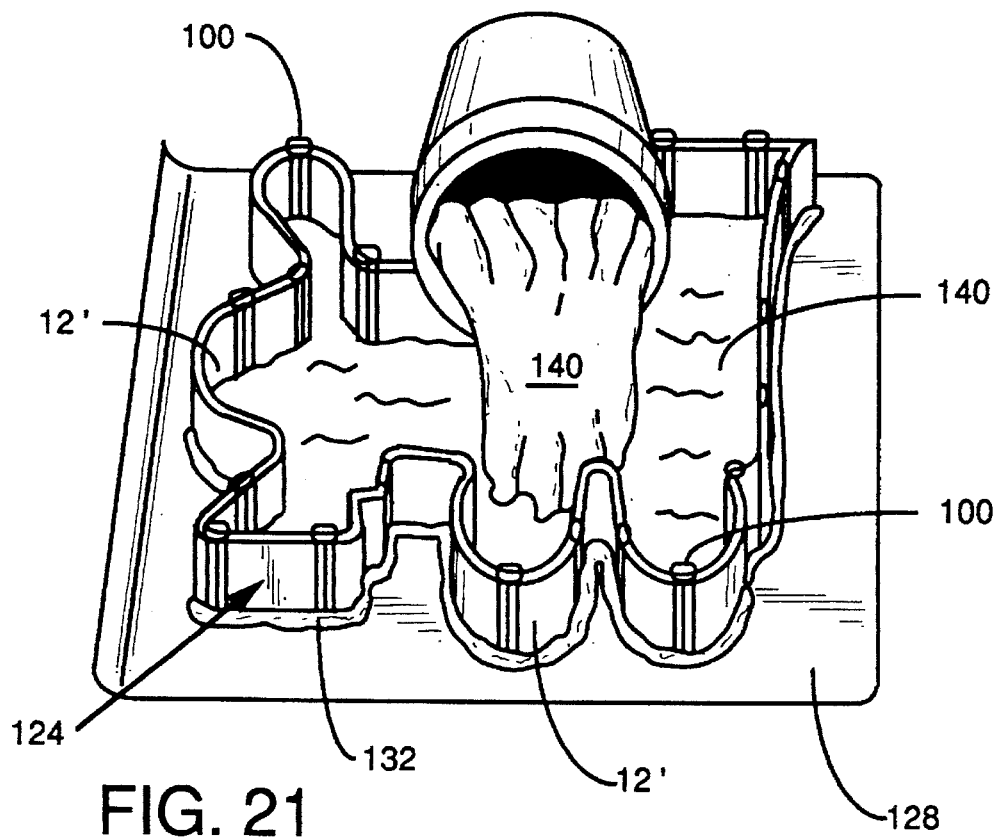
FIG. 21 is a perspective view of the assemblies of FIG. 18 received on a baking pan and sealed thereto by the sealant illustrated in FIG. 20 with a premixed cake mix being poured therein.
Figure 22:
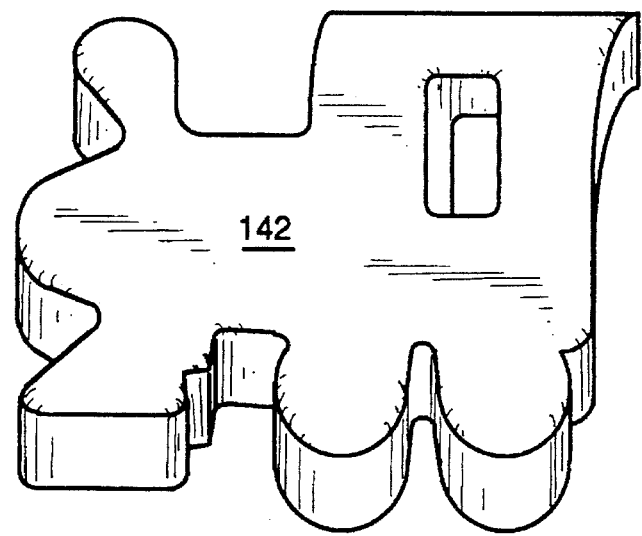
FIG. 22 is a perspective view of a cake baked with the apparatus and methods illustrated in FIGS. 18–21.

After the baking form (124, 126) and cookie sheet 128 assembly has been removed from the oven, it is permitted to cool. Thereafter, depending upon the manufacturer's instructions for the cake mix 140 being used, the inside surfaces of the forms (124, 126) and the portion of the cookie sheet 128 located within the interior perimeter of form 124 may be oiled or dusted with flour prior to adding any premixed commercially available cake mix therein as illustrated in FIG. 21. After the cake mix 140 has been poured into the baking form 124, the form 124 is placed in an oven and the cake mix 140 is baked in accordance with the instructions provided by the manufacturer of cake mix 140.

After the cake mix 140 has been baked for the prescribed time period, the baking form (124, 126) and cookie sheet 128 assembly is removed from the oven and permitted to cool to a safe working temperature. The forms (124, 126) are removed by preferably tapping the tops of each panel member 12' comprising the forms (124, 126) with a solid object such as, for example, a knife handle. Such tapping action causes the sealant bead 132, which is now very brittle, to shatter and flake off around the perimeter of the forms (124, 126). Thereafter, the panel members 12' are removed from around the perimeter of the solidified cake 142 by grasping the splicing clips 100 one at a time and pulling them out of engagement with the hook members 20' of the corresponding panel members 12'. The panel members 12' are then carefully peeled way from the sides of the cake 142. After the panel members 12' have been removed, the cake 142, having the desired predetermined shape of a locomotive, is ready to have icing applied thereto. See FIG. 22. I have found that the panel members 12' that are provided with creases 30' serve to create slight indentations in the side of the resulting cake 142 which serve to help the icing to adhere to the sides thereof.

After the cake baking process has been completed, the panel members 12' can be washed with the other baking utensils and reused again and again to create other cakes of various shapes and sizes. It will be appreciated that the present panel members 12' can be used in connection with a variety of different moldable ingredients to create a molded food product therefrom. As used herein, the term "moldable" means any food product ingredient or mixture that initially has a liquid or pourable consistency and that, after additional processing, solidifies to a consistency wherein it can retain a predetermined shape after the mold has been removed therefrom. Such additional processing may comprise, for example, heating the mixture, cooling the mixture or letting the mixture solidify at room temperature.

The skilled artisan will recognize that the above-described method for baking cakes may be also used to create a variety of different three dimensional objects. For example, the cookie sheet 128 may be replaced with another member fabricated from a variety of different appropriate materials (e.g., steel, wood, etc.) that has a surface capable of achieving a seal with the panel members 12'. An appropriate sealant material, such as, for example, commercially available silicone material may be used to achieve a fluid tight-seal between the panel members 12' and the sheet member 128. For example, three dimensional concrete letters may be formed by using a wooden sheet member and silicone sealant material to achieve a seal between the panel member assembly and the sheet member to create a form having a desired perimetrical shape. The concrete is then poured into the form and allowed to solidify. Thereafter, the panel members are removed by first cutting away the silicone sealant and then slidably disengaging each panel member in the manner described above. The reader will also appreciate that the panel members 12 can also be used in the above-described manners to form moldable materials into predetermined shapes and that such methods are not limited to being accomplished only through the use of panel members 12' and splicing clips 100.

Those of ordinary skill in the art will also appreciate that panel members having the same physical attributes as the panel members depicted in FIGS. 1–4 can be similarly used to create forms for molding a variety of different foodstuffs. In this embodiment, the preferred panel size is 2.5"×5"; however, the panel members, generally designated as 212, may be provided in a variety of different sizes for creating various differently shaped forms.

Figure 23:
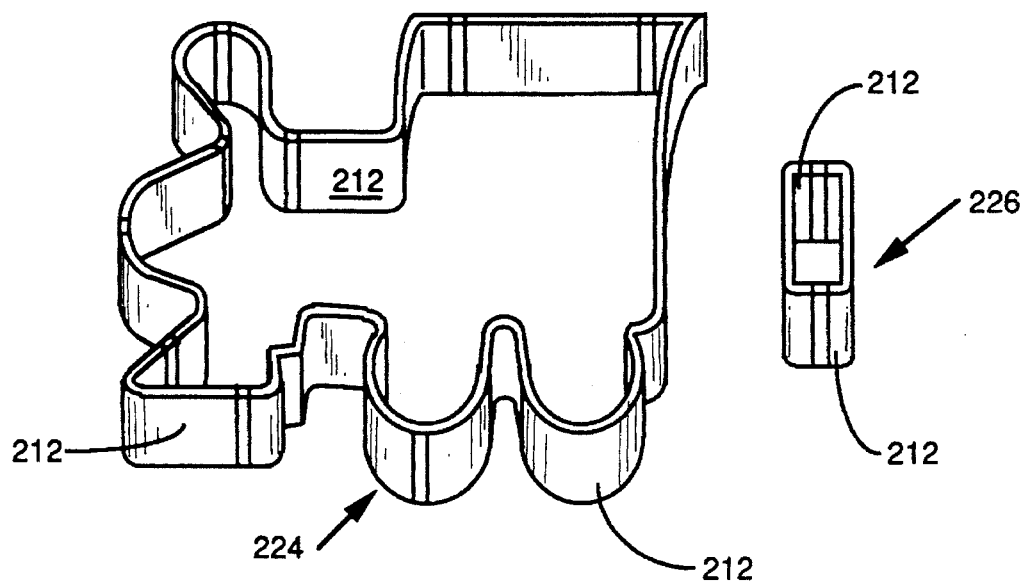
FIG. 23 is a perspective view of assemblies of other panels of the present invention formed in the shape of a locomotive and window therefor for creating a form for baking a cake having the shape of a locomotive with a window opening therein.
Figure 24:
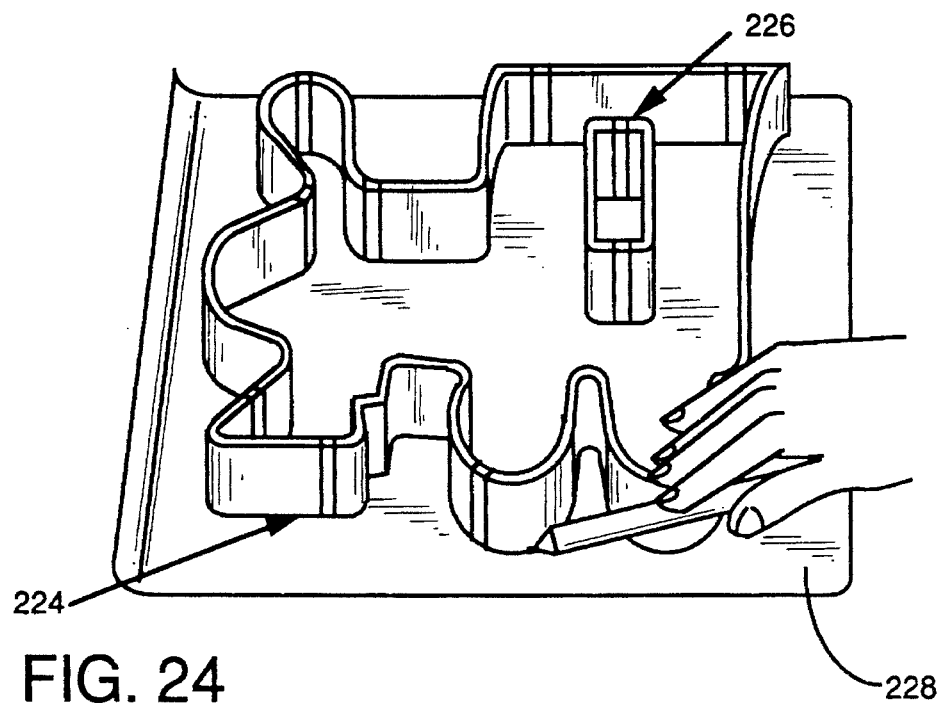
FIG. 24 is a perspective view of the assemblies of FIG. 23 received on a flat baking pan and being traced therearound with a non-toxic marker to form outlines of the assemblies of FIG. 23 on the baking pan.

FIGS. 23 and 24 illustrate a preferred method of using the panel members 212 to bake a cake having the shape of a locomotive. The artisan will further appreciate, however, that the method depicted in FIGS. 23 and 24 and described immediately below can be used to create cakes of all shapes and sizes. The panel members 212 can also be bent into a variety of different configurations and interconnected to form various predetermined shapes that have been laid out on graph paper having, for example 1"×1" squares in the manner discussed above. As can be seen in FIG. 23, the method then includes bending each panel member 212 in a desired shape and slidably interconnecting the panel members 212 in the manner as was described above to create a locomotive-shaped form, generally designated as 224 and a window-shaped form 226.

After the forms (224, 226) have been slidably assembled together, they are placed on a baking sheet 228. Non-toxic sealant material that was described hereinabove is preferably used in one of the above-described manners to achieve a fluid-tight seal between the forms (224, 226) and the baking sheet 228. Thereafter, the cake mix or other foodstuff material is poured into the forms and cured in the manner described above. After the mix has been baked or cured to its desired state, the forms (224, 226) can be removed therefrom by striking the forms lightly with an object, which causes the sealant to shatter, thereby enabling the panels to be removed therefrom.

Accordingly, the present invention provides reusable and inexpensive apparatus that may be used to create landscaping barriers and forms for pouring concrete. The present invention also provides a means for preventing soil erosion on sloping embankments and can also be used to create three dimensional concrete figures and letters for signs and the like. The present invention also provides a means for creating upwardly extending barrier walls that may be used to create receptacles or protect plants, trees and the like. In addition, the present panel members are well-suited for creating molds for moldable ingredients such as cake mixes and the like. It will be understood, however, that various changes in the details, materials and arrangements of parts which have been herein described and illustrated in order to explain the nature of the invention may be made by those skilled in the art within the principle and scope of the invention as expressed in the appended claims.

I claim:

1. A method for preparing a food product having a predetermined shape from a moldable mixture of food product ingredients, comprising the steps of:
    (a) providing a plurality of substantially planar panel members having joint means formed therein to enable said panel members to be removably interconnected together at their edges;
    (b) bending said panel members so that, in series, they form said predetermined perimetrical shape;
    (c) removably interconnecting said panel members at their edges to form a panel assembly having said perimetrical shape;
    (d) placing said panel assembly onto a surface of a bottom member, said panel assembly and said bottom member forming an ingredient receiving cavity;
    (e) sealing the intersection of said panel assembly with said surface with a nontoxic sealant material to make said intersection substantially fluid-tight;
    (f) pouring said moldable mixture of ingredients into said ingredient receiving cavity;
    (g) processing said mixture to cause it to solidify into said food product; and
    (h) removing said panel assembly from the perimeter of the food product.

2. The method of claim 1 wherein said processing step comprises one of the steps selected from the group consisting of heating the moldable mixture, cooling the moldable mixture, and permitting the moldable mixture to stand at room temperature for a sufficient amount of time to permit said moldable mixture to solidify.

3. A method for baking a cake having a predetermined perimetrical shape from a moldable mixture of ingredients, comprising the steps of:
    (a) providing a plurality of substantially planar panel members having joint means formed therein to enable said panel members to be removably interconnected together at their edges by a removable connection means;
    (b) bending said panel members so that, in series, they form said predetermined perimetrical shape;
    (c) interconnecting said panel members to form a panel assembly having said predetermined perimetrical shape of the cake;
    (d) placing said panel assembly onto a surface of a bottom member to create an ingredient receiving cavity;
    (e) sealing the intersection of said panel assembly with said surface with a nontoxic sealant material to make said intersection fluid-tight;
    (f) pouring the ingredients into said ingredient receiving cavity;
    (g) baking said ingredients within the ingredients receiving cavity at a predetermined baking temperature for a predetermined amount of baking time to create the cake having said predetermined perimetrical shape; and
    (h) removing said panel assembly from the perimeter of the cake.

4. The method of claim 3 wherein said sealant comprises a flour and water mixture.

5. The method of claim 3 wherein said sealing step comprises the steps of:
    (a) tracing around the perimeter of said panel assembly with a non-toxic marker to reproduce an outline of the perimeter of the panel assembly on said surface of said bottom member;
    (b) removing said panel assembly from said bottom member;
    (c) applying a bead of sealant material having a predetermined width and thickness onto said surface of said bottom member such that said sealant bead covers said outline;
    (d) placing said panel assembly onto said surface such that the one edge of said panel assembly is received in said sealant bead to form a fluid-tight seal between said panel assembly and said surface to create a baking form having the predetermined perimetrical shape of the cake; and
    (e) baking said baking form at a predetermined sealant baking temperature for a predetermined sealant baking time.

6. The method of claim 5, wherein said removing step comprises the steps of:
    (a) striking the top of the panel assembly with an object to cause said panels of said panel assembly to disengage said sealant bead; and
    (b) individually slidably disengaging said panel members from each other.

7. The method of claim 3 wherein said bottom member comprises a cookie sheet.

8. A method for preparing a food product having a predetermined shape from a moldable mixture of food product ingredients, comprising the steps of:
    (a) providing a plurality of substantially planar panel members having joint means formed therein to enable said panel members to be slidably interconnected together at their edges;
    (b) bending said panel members so that, in series, they form said predetermined perimetrical shape;
    (c) slidably interconnecting said panel members at their edges to form a panel assembly having said perimetrical shape;

(d) placing said panel assembly onto a surface of a bottom member, said panel assembly and said bottom member forming an ingredient receiving cavity;

(e) sealing the intersection of said panel assembly with said surface with a nontoxic sealant material to make said intersection substantially fluid-tight;

(f) pouring said moldable mixture of ingredients into said ingredient receiving cavity;

(g) processing said mixture to cause it to solidify into said food product; and (h) removing said panel assembly from the perimeter of the food product.

* * * * *

UNITED STATES PATENT AND TRADEMARK OFFICE
CERTIFICATE OF CORRECTION

PATENT NO. : 5,453,287
DATED : September 26, 1995
INVENTOR(S) : J. Garth Close

It is certified that error appears in the above-indentified patent and that said Letters Patent is hereby corrected as shown below:

Col. 2, line 47, delete "need" and substitute therefor --needed--.

Col. 2, line 58, delete "finish" and substitute therefor --finished--.

Col. 5, line 67, after "may" insert --be--.

Signed and Sealed this

Eleventh Day of June, 1996

Attest:

BRUCE LEHMAN

Attesting Officer     Commissioner of Patents and Trademarks